MAXIMUM AMPLITUDE DETECTOR CIRCUIT OF MAIN LOBE IN $\frac{\sin x}{x}$ WAVEFORM

Filed June 24, 1964 2 Sheets-Sheet 1

INVENTORS E. HEBER
N. K. LUND
BY
ATTORNEY

United States Patent Office 3,354,400
Patented Nov. 21, 1967

3,354,400
MAXIMUM AMPLITUDE DETECTOR CIRCUIT OF MAIN LOBE IN $\frac{\sin x}{x}$ WAVEFORM Emery Heber, West Orange, and Nean K. Lund, Berkeley Heights, N.J., assignors to Bell Telephone Laboratories, Incorporated, New York, N.Y., a corporation of New York Filed June 24, 1964, Ser. No. 377,770
4 Claims. (Cl. 328—150)

Figure 1:
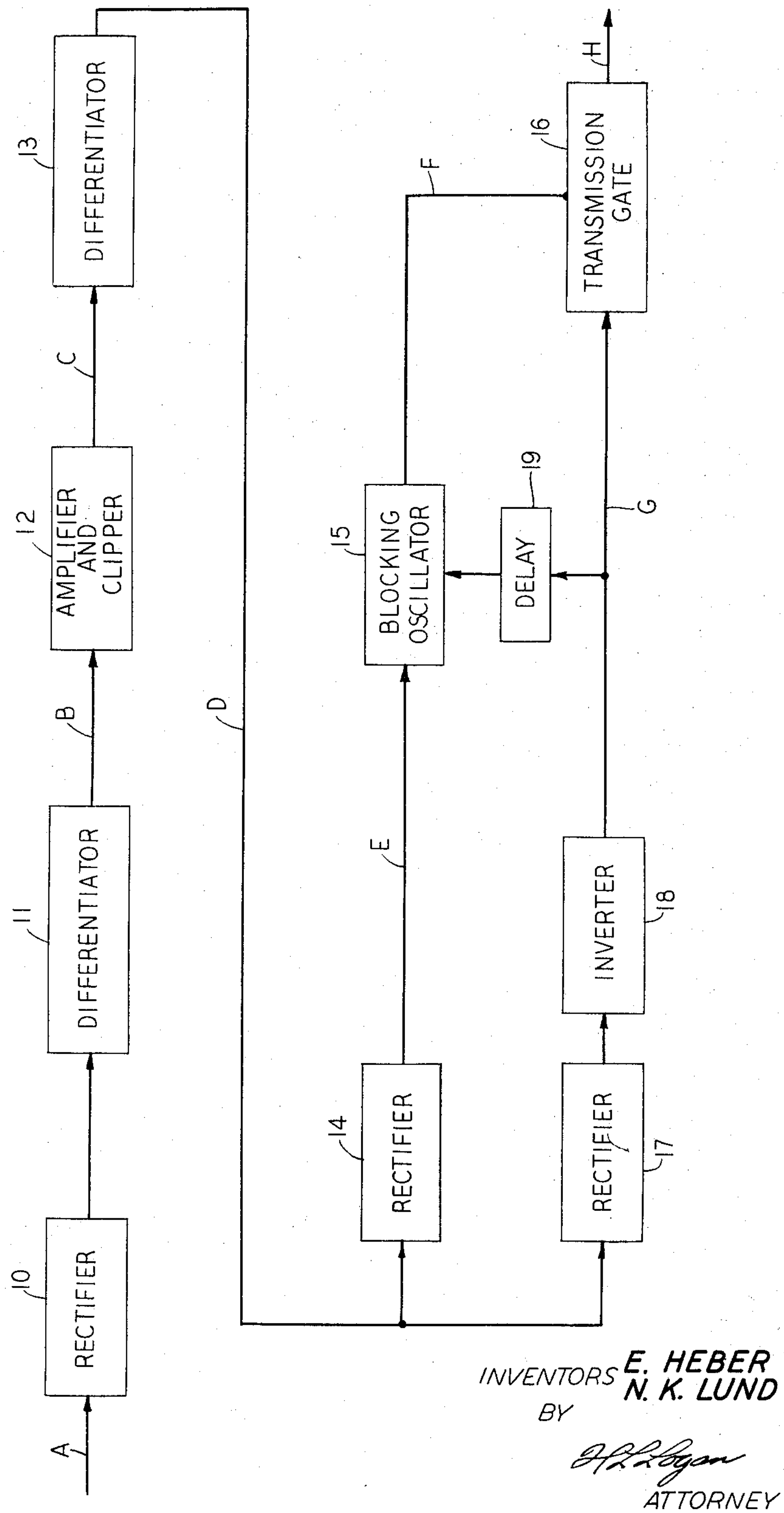

This invention relates to electronic circuits having pulse width discriminatory response characteristics and in particular to circuits that produce outputs only in response to pulses having predetermined width characteristics.

In some pulse handling equipment it is necessary to produce an output pulse corresponding in time to substantially the maximum amplitude of the main lobe or pulse in a $$\frac{\sin x}{x}$$

type pulse train.

One approach to detecting the main lobe of a $$\frac{\sin x}{x}$$

type of pulse train is to use an amplitude threshold response circuit. Amplitude threshold detecting schemes have not, however, been too successful for several reasons. Firstly, the side lobes of the pulse train occasionally exceed the threshold level, thereby causing false output pulses to appear. Secondly, it is difficult, if not impossible, to maintain the threshold level so that the output pulse corresponds in time to substantially the maximum amplitude of the main lobe.

Another approach is to use a pulse width discriminator to take advantage of the fact that the pulse width of the main lobe exceeds those of the side lobes. To applicants' knowledge, however, prior art pulse width discriminators do not produce output pulses indicative of the occurrence of a main lobe pulse until a portion of the main lobe pulse greater in duration than the maximum anticipated duration of the side lobes has occurred. This limitation makes it virtually impossible to produce output pulses corresponding in time to substantially the maximum amplitudes of the main lobes.

An object of the invention is to produce output pulses corresponding in time to substantially the maximum amplitudes of the main lobes of $$\frac{\sin x}{x}$$

type pulse trains.

This and other objects are achieved through the use of the invention in one of its broader forms by first producing square waves substantially corresponding in time to the positive going portions of the positive main and side lobes of a $$\frac{\sin x}{x}$$

pulse train. The square waves thus produced are differentiated to produce pulses corresponding in time to the leading and trailing edges of the square waves. When a trailing edge pulse occurs following a predetermined interval after its preceding leading edge pulse the trailing edge pulse is, in effect passed to an output terminal.

In accordance with the invention, the above-mentioned predetermined interval is greater than the maximum anticipated duration of the square waves corresponding to the positive going portions of the positive side lobes, but less than the minimum anticipated duration of the square wave corresponding to the positive going portion of the main lobe. The only trailing edge pulse made available at the output terminal is therefore the one corresponding to the trailing edge of the square wave corresponding to the positive going portion of the main lobe. Furthermore, because the square waves correspond in time to only the positive going portions of the positive side lobes and main lobes of the wave train, the pulse made available at the output terminal corresponds to substantially the maximum amplitude of the main lobe.

In one embodiment of the invention, a $$\frac{\sin x}{x}$$

type pulse train is rectified and differentiated so that only the positive portions of the pulse train are differentiated. The differentiated output is rectified, amplified and limited to produce square waves substantially corresponding in time to the positive going portions of the positive lobes of the $$\frac{\sin x}{x}$$

pulse train. These square waves are then differentiated to produce pulses corresponding to the leading and trailing edges thereof.

The leading edge pulses in this embodiment are used to trigger a blocking oscillator, which, in turn, disables a normally enabled transmission gate. The trailing edge pulses, on the other hand, are applied to the transmission input of the transmission gate and also by way of a delay circuit to a reset input on the blocking oscillator.

Unless reset, the blocking oscillator disables the transmission gate for the maximum anticipated duration of the square waves corresponding to the side lobes, but less than the minimum anticipated duration of the square wave corresponding to the main lobe. The resetting feature eliminates the possibility of producing false outputs when the time interval between two successive leading edge pulses is less than the duration of the output that would otherwise be produced by the blocking oscillator. In other words, it assures that the blocking oscillator performs its intended function by placing it in a condition to be triggered by each leading edge pulse.

In operation, the transmission gate of the embodiment is disabled for each of the trailing edge pulses produced as a result of the side lobes. The gate, however, is enabled and produces an output upon the occurrence of a trailing edge pulse produced by the main lobe which output substantially corresponds in time to the maximum amplitude of the main lobe.

Other objects and features of the invention will become apparent from a study of the following detailed description of a specific embodiment.

In the drawings:

FIG. 1 discloses in block diagram form one embodiment of the invention; and

FIGS. 2A through 2H illustrate waveforms of voltages appearing on identified leads in the embodiment of FIG. 1.

Figures 2A, 2B, 2C, 2D, 2E, 2F, 2G, 2H:
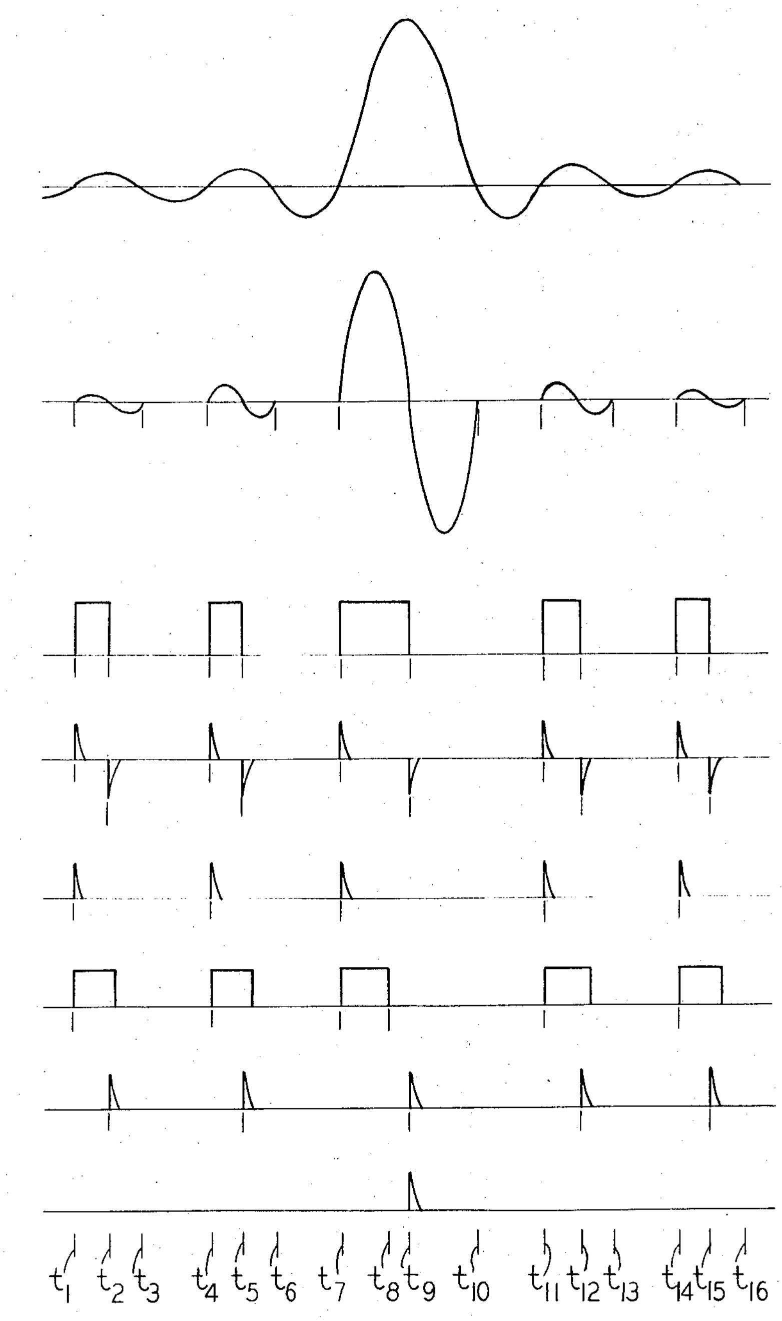

In the embodiment of FIG. 1 the positive portions of a typical $$\frac{\sin x}{x}$$

pulse train appearing on an input lead A and illustrated in FIG. 2A are passed by a rectifier 10 to a differentiator 11. The output of differentiator 11 as it appears on an output lead B is shown in FIG. 2B (FIGS. 2A through 2H have been placed in time alignment so that the time scale shown in FIG. 2H may be applied to FIGS. 2A through 2G). This output is amplified and clipped by an amplifier and clipper 12 to produce square waves corresponding in time to the positive portions of the waveforms of FIG. 2B. The output of amplifying clipper 12 as it appears on an output lead C is represented in FIG. 2C. This square wave output is applied to a differentiator 13 which produces on an output lead D positive and negative pulses corresponding to the leading and trailing edges, respectively, of the square waves. These pulses are portrayed in FIG. 2D.

The positive pulses on lead D are passed to a lead E by a rectifier 14. These pulses are depicted in FIG. 2E. Each positive pulse on lead E triggers a blocking oscillator 15 to produce on a lead F a square wave output as shown in FIG. 2F. The square wave outputs on lead F are applied to a disabling input of a normally enabled transmission gate 16. Gate 16 remains disabled for the duration of each of the square wave outputs appearing on lead F.

The negative pulses on lead D are passed by a rectifier 17 and inverted by an inverter 18 to produce positive pulses on inverter 18 output lead G. The positive pulses appearing on lead G, which are illustrated in FIG. 2G, are applied to both a delay circuit 19 and the transmission input of transmission gate 16. The output of delay circuit 19 is applied to blocking oscillator 15 to reset the blocking oscillator when it has not completed its blocking cycle. (A blocking oscillator of this type is disclosed in Circuit 6–21 of A Handbook of Selected Semiconductor Circuits, prepared by Transistor Applications, Inc. for Bureau of Ships, Department of the Navy, U.S. Government Printing Office: 1960 0–535868. In thisc circuit, triggering inputs are applied at one input terminal while turn-off inputs are applied at a second input terminal by a delay line.) The delay provided by delay circuit 19 is sufficient to prevent blocking oscillator 15 from being reset until the lead G pulse effecting the resetting operation has terminated on lead G. The output of transmission gate 16 appears on a lead H and is represented in FIG. 2H.

The operation of the embodiment of FIG. 1 is now presented in greater detail.

Rectifier 10 and differentiator 11 respond to the positive side lobe illustrated between times *t1* and *t3* in FIG. 2A to cause the relatively small amplitude sinusoidal-like waveform shown between times *t1* and *t3* of FIG. 2B to appear on lead B. Amplifier and clipper 12 respond to this sinusoidal-like waveform to produce on lead C the square wave represented between times *t1* and *t2* of FIG. 2C. This square wave corresponds in time to the positive portion of the sinusoidal-like waveform of FIG. 2B. Furthermore, this square wave substantially corresponds in time to the positive going portion of the side lobe between times *t1* and *t3* of FIG. 2A. Differentiator 13 differentiates the square wave portrayed between times *t1* and *t2* of FIG. 2C to produce the positive and negative pulses at times *t1* and *t2*, respectively, of FIG. 2D. The positive and negative pulses are produced as a result of differentiating the leading and trailing edges, respectively, of the square wave.

The positive pulse appearing on lead D is passed by rectifier 14 and is consequently shown at time *t1* in FIG. 2E. This pulse triggers blocking oscillator 15 as represented by the positive square wave starting at time *t1* of FIG. 2F. The positive square wave disables transmission gate 16.

Rectifier 17 and inverter 18 pass and invert the negative pulse at time *t2* of FIG. 2D. This inverted pulse appears as a positive pulse at time *t2* in FIG. 2G. At this time the positive pulse at time *t2* occurs on lead G. Transmission gate 16, however, is disabled as a result of the triggering action produced by the pulse at time *t1* of FIG. 2E. The positive pulse at time *t2* of FIG. 2G therefore does not pass to lead H and consequently such a pulse is not shown at time *t2* of FIG. 2H.

As mentioned previously, delay circuit 19 provides a delay so that blocking oscillator 15, when it has not completed its blocking cycle, is reset only after the pulse on lead G instituting the resetting has terminated. Because the normal blocking cycle of the blocking oscillator is greater than the duration between times *t1* and *t2*, the blocking oscillator is reset shortly after the pulse appearing at time *t2* of FIG. 2G.

The embodiment does not respond to the negative portion of FIG. 2A between times *t3* and *t4* because of rectifier 10. For the same reason, the embodiment does not respond to the negative portions of FIG. 2A between times *t6* and *t7*, *t10* and *t11*, and *t13* and *t14*.

The response of the embodiment to the positive side lobe between times *t4* and *t6* is identical to the response discussed above with respect to the positive side lobe between times *t1* and *t3*. It should be noted that as at time *t2*, an output pulse does not occur at time *t5* in FIG. 2H.

The main lobe portrayed between times *t7* and *t10* of FIG. 2A is acted upon by rectifier 10 and differentiator 11 to produce the relatively large amplitude sinusoidal-like waveform shown between these times on FIG. 2B. Amplifier and clipper 12 respond to the positive portion of this sinusoidal-like waveform to produce a square wave represented between times *t7* and *t8* of FIG. 2C. This square wave is differentiated by differentiator 13 and the leading edge pulse produced thereby triggers blocking oscillator 15. In the absence of a resetting signal, blocking oscillator 15 provides a positive output which has a duration greater than the maximum anticipated duration of the positive going portions of the side lobes, but less than the minimum anticipated duration of the positive going portion of the main lobe. Blocking oscillator 15 therefore completes its blocking cycle before the occurrence of the trailing edge pulse produced by the action of differentiator 13 on the pulse appearing between times *t7* and *t9* of FIG. 2C. This is shown by the termination of the square wave at time *t8* in FIG. 2F and the appearance of the trailing edge pulse at time *t9* in FIG. 2G. Because the trailing edge pulse at time *t9* occurs after blocking oscillator 15 has removed the disabling signal from transmission gate 16, this pulse is passed to lead H as indicated in FIG. 2H. In practice this pulse on lead H corresponds to substantially the maximum amplitude of the main lobe.

The response of the embodiment to the positive portions between times *t11* and *t13* and times *t14* and *t16* of FIG. 2A is identical to that discussed with respect to the positive portion between times *t1* and *t3*. It should be noted that as indicated in FIG. 2H outputs on lead H do not occur at times *t12* and *t15*.

From the above explanation of the embodiment of FIG. 1 it is believed to be apparent that the embodiment in response to a $$\frac{\sin x}{x}$$

input pulse train produces an output at only substantially the maximum amplitude of the main lobe of the train. It should be noted, however, that the embodiment will perform as a pulse width discriminator for pulse trains other than those of the $$\frac{\sin x}{x}$$

type. When so used, the outputs produced still occur at substantially the maximum amplitudes of the pulses to be recognized.

Although only one embodiment of the invention has been discussed in detail, various other embodiments may be devised without departing from the spirit and scope of the invention. Differentiator 13, rectifiers 14 and 17, inverter 18, blocking oscillator 15, delay unit 19 and transmission gate 16 may all, for example, be replaced by the discriminator forming the principal subject matter of E. Heber, Ser. No. 377,769, filed on even date herewith.

What is claimed is:

1. A system for producing an output pulse corresponding in time to substantially the maximum amplitude of the main lobe only of a $$\frac{\sin x}{x}$$

type of pulse wave train, said system comprising means responsive to said side and main lobes to produce substantially square waves corresponding in time to substantially the positive going portions of said side and main lobes whereby the duration of said square wave corresponding in time to the positive going portion of said main lobe exceeds the durations of said square waves corresponding in time to the positive going portions of said side lobes, means connected to the first-mentioned means to discriminate against said square waves corresponding in time to the positive going portion of said side lobes and producing an output pulse in response to the trailing edge of the relatively longer duration square wave corresponding in time to said positive going portion of said main lobe, and an output terminal connected to said discriminator to make available the output of said discriminator.

2. A system for producing an output pulse corresponding in time to substantially the maximum amplitude of the main lobe only of a $$\frac{\sin x}{x}$$

type of pulse wave train, said system comprising means responsive to said side and main lobes to produce substantially square waves corresponding in time to substantially the positive going portions of said side and main lobes, means responsive to said square waves to produce pulses corresponding to the leading and trailing edges of said square waves, a normally enabled transmission gate, means responsive to said pulses corresponding to the leading edges of said square waves to disable said transmission gate for a predetermined period of time less than one-half the duration of said main lobe and greater than one-half the maximum duration of said side lobes, means for applying said pulses corresponding to the trailing edges of said square waves both to said disabling means to reset said disabling means when said predetermined period has not expired and to the transmission input of said transmission gate, and an output terminal connected to said transmission gate for making available said transmission gate output.

3. A system for producing an output pulse corresponding in time to substantially the maximum amplitude of the main lobe only of a $$\frac{\sin x}{x}$$

type of pulse train, said system comprising means for rectifying said $$\frac{\sin x}{x}$$

type of pulse train to produce as an output the main lobe and the positive side lobes, differentiating means connected to said rectifying means to differentiate said main lobe and said positive side lobes, means connected to said differentiating means to amplify and clip the positive portions of the output of said differentiating means to produce substantially square waves therefrom, means connected to said amplifying and differentiating means to discriminate against the shorter square waves produced in response to said side lobes and to produce an output pulse in response to the trailing edge of the square wave produced in response to said main lobe, and an output terminal connected to said pulse width discriminator to make available said pulse width discriminator output.

4. A system for producing an output pulse corresponding in time to substantially the maximum ampltiude of the main lobe only of a $$\frac{\sin x}{x}$$

type of pulse train, said system comprising means for rectifying said $$\frac{\sin x}{x}$$

type of pulse train to produce as an output the main lobe and the positive side lobes, first differentiating means connected to said rectifying means to differentiate said main lobe and said positive side lobes, means connected to said first differentiating means to amplify and clip the positive portions of the output of said differentiating means to produce substantially square waves therefrom, second differentiating means connected to said amplifying and clipping means, a blocking oscillator having a triggering input, a reset input and a normal blocking interval less than one-half of the duration of said main lobe but greater than one-half of the maximum duration of said positive side lobes, means connected between said second differentiating means and said blocking oscillator triggering input to trigger said oscillator in response to the outputs of said second differentiating means corresponding to the leading edges of said square wave outputs of said amplifying and clipping means, delay means connected between said second differentiating means and said blocking oscillator reset input to reset said oscillation shortly after the occurrence of said second differentiating means outputs corresponding to the trailing edges of said square wave outputs of said amplifying and clipping means, a normally enabled transmission gate having a transmission input, a disabling input and an output, means for applying the output of said blocking oscillator to said transmission gate disabling input, means for applying said second differentiating means output corresponding to the trailing edges of said square wave outputs of said amplifying and clipping means to said transmission gate transmission input, and an output terminal connected to said transmission gate output.

References Cited

UNITED STATES PATENTS

| | | | |
|---|---|---|---|
| 2,448,718 | 9/1948 | Koulicovitch | 328—150 |
| 3,184,606 | 5/1965 | Ovenden et al. | 307—88.5 |
| 3,254,230 | 5/1966 | Wahrer | 328—150 |

ARTHUR GAUSS, *Primary Examiner.*

J. S. HEYMAN, *Examiner.*